US012679758B2

(12) United States Patent
Kuang

(10) Patent No.: US 12,679,758 B2
(45) Date of Patent: Jul. 14, 2026

(54) OPTICAL GLASS, GLASS PREFORM, OPTICAL ELEMENT AND OPTICAL INSTRUMENT

(71) Applicant: CDGM GLASS CO., LTD, Chengdu (CN)

(72) Inventor: Bo Kuang, Chengdu (CN)

(73) Assignee: CDGM GLASS CO., LTD, Chengdu (CN)

( * ) Notice: Subject to any disclaimer, the term of this patent is extended or adjusted under 35 U.S.C. 154(b) by 447 days.

(21) Appl. No.: 18/231,424

(22) Filed: Aug. 8, 2023

(65) Prior Publication Data

US 2024/0076227 A1    Mar. 7, 2024

(30) Foreign Application Priority Data

Aug. 26, 2022    (CN) ......................... 202211031087.X

(51) Int. Cl.
*C03C 3/068*          (2006.01)
*G02B 1/00*          (2006.01)

(52) U.S. Cl.
CPC ................ *C03C 3/068* (2013.01); *G02B 1/00* (2013.01)

(58) Field of Classification Search
CPC .................................. C03C 3/068; G02B 1/00
See application file for complete search history.

(56) References Cited

U.S. PATENT DOCUMENTS

| | | | |
|---|---|---|---|
| 9,487,432 B2 * | 11/2016 | Kuang | .................... C03C 3/068 |
| 11,878,938 B2 * | 1/2024 | Sun | ......................... C03C 3/068 |
| 2019/0233323 A1 * | 8/2019 | Ogino | ....................... C03C 4/00 |

* cited by examiner

*Primary Examiner* — Cameron K Miller
(74) *Attorney, Agent, or Firm* — Oliff PLC

(57)          ABSTRACT

An optical glass, wherein components thereof are represented by weight percentage, including: 1-15% of $SiO_2$; 5-20% of $B_2O_3$; 25-50% of $La_2O_3$; 1-12% of $ZrO_2$; 5-20% of $TiO_2$; 6-35% of RO, and the RO is total content of MgO, CaO, SrO, and BaO. Through rational component design, the optical glass has low density while having desired refractive index and Abbe number, which meets the light-weight application of optical instruments.

17 Claims, No Drawings

OPTICAL GLASS, GLASS PREFORM, OPTICAL ELEMENT AND OPTICAL INSTRUMENT

TECHNICAL FIELD

The present invention relates to an optical glass, in particular to an optical glass having a refractive index of 1.87-1.93 and an Abbe number of 28-35, as well as a glass preform made of the optical glass, an optical element and an optical instrument.

BACKGROUND

In recent years, with the rapid development of photoelectric information, digital display, monitoring security, vehicle imaging and other fields, the optical element applied to optical system is required to be miniature and lightweight with high performance. High-refractivity and high-dispersion optical glass can be coupled with low-dispersion optical glass, thereby effectively eliminating chromatic aberration and secondary spectrum. At the same time, it can effectively shorten the total optical length of the lens and miniaturize the imaging system. Therefore, this type of glass has extensive application prospects. Under the same curvature radius, the glass with higher refractive index can obtain a larger imaging field of view, which is conducive to reducing the number of optical elements in the optical instrument. With the development trend of miniaturization of optical instruments, the trend of demand for glass with high refractive index is becoming more and more obvious. In addition to reducing the number of optical elements in the optical system, reducing the density of the optical glass is also an important way to achieve the purpose of lightweight optical instruments.

SUMMARY

A technical problem to be solved by the present invention is to provide an optical glass with low density and high refractive index.

To solve the technical problem, the technical scheme of the present invention provides:

An optical glass, wherein components thereof are represented by weight percentage, comprising: 1-15% of $SiO_2$; 5-20% of $B_2O_3$; 25-50% of $La_2O_3$; 1-12% of $ZrO_2$; 5-20% of $TiO_2$; 6-35% of RO, wherein the RO is total content of MgO, CaO, SrO, and BaO.

Furthermore, the optical glass, wherein components thereof are represented by weight percentage, further comprising: 0-8% of $Y_2O_3$; and/or 0-8% of $Gd_2O_3$; and/or 0-5% of $Yb_2O_3$; and/or 0-12% of $Nb_2O_5$; and/or 0-10% of ZnO; and/or 0-8% of $Rn_2O$; and/or 0-5% of $GeO_2$; and/or 0-5% of $WO_3$; and/or 0-5% of $Ta_2O_5$; and/or 0-5% of $Al_2O_3$; and/or 0-1% of clarifying agent, the $Rn_2O$ is one or more of $Li_2O$, $Na_2O$, and $K_2O$, and the clarifying agent is one or more of $Sb_2O_3$, SnO, $SnO_2$, and $CeO_2$.

An optical glass, wherein components thereof are represented by weight percentage, consisting of: 1-15% of $SiO_2$; 5-20% of $B_2O_3$; 25-50% of $La_2O_3$; 1-12% of $ZrO_2$; 5-20% of $TiO_2$; 6-35% of RO; 0-8% of $Y_2O_3$; 0-8% of $Gd_2O_3$; 0-5% of $Yb_2O_3$; 0-12% of $Nb_2O_5$; 0-10% of ZnO; 0-8% of $Rn_2O$; 0-5% of $GeO_2$; 0-5% of $WO_3$; 0-5% of $Ta_2O_5$; 0-5% of $Al_2O_3$; and 0-1% of clarifying agent, the RO is total content of MgO, CaO, SrO, and BaO, $Rn_2O$ is one or more of $Li_2O$, $Na_2O$, and $K_2O$, and the clarifying agent is one or more of $Sb_2O_3$, SnO, $SnO_2$, and $CeO_2$.

Furthermore, the optical glass, wherein components thereof are represented by weight percentage, in which: $CaO/(SiO_2+ZrO_2)$ is 0.02-1.0, preferably $CaO/(SiO_2+ZrO_2)$ is 0.05-0.8, more preferably $CaO/(SiO_2+ZrO_2)$ is 0.1-0.6, further preferably $CaO/(SiO_2+ZrO_2)$ is 0.1-0.5.

Furthermore, the optical glass, wherein components thereof are represented by weight percentage, in which: $TiO_2/BaO$ is 0.3-3.0, preferably $TiO_2/BaO$ is 0.4-2.0, more preferably $TiO_2/BaO$ is 0.6-1.5, further preferably $TiO_2/BaO$ is 0.8-1.3.

Furthermore, the optical glass, wherein components thereof are represented by weight percentage, in which: $TiO_2/(La_2O_3+ZnO)$ is 0.1-0.6, preferably $TiO_2/(La_2O_3+ZnO)$ is 0.15-0.55, more preferably $TiO_2/(La_2O_3+ZnO)$ is 0.2-0.5, further preferably $TiO_2/(La_2O_3+ZnO)$ is 0.25-0.45.

Furthermore, the optical glass, wherein components thereof are represented by weight percentage, in which: $SiO_2/(CaO+BaO)$ is 0.05-1.5, preferably $SiO_2/(CaO+BaO)$ is 0.1-1.0, more preferably $SiO_2/(CaO+BaO)$ is 0.2-0.85, further preferably $SiO_2/(CaO+BaO)$ is 0.35-0.75.

Furthermore, the optical glass, wherein components thereof are represented by weight percentage, in which: $BaO/Nb_2O_5$ is above 0.8, preferably $BaO/Nb_2O_5$ is 1.0-20.0, more preferably $BaO/Nb_2O_5$ is 1.5-10.0, further preferably $BaO/Nb_2O_5$ is 2.0-5.0.

Furthermore, the optical glass, wherein components thereof are represented by weight percentage, in which: $(CaO+ZnO)/BaO$ is 0.1-3.0, preferably $(CaO+ZnO)/BaO$ is 0.2-2.0, more preferably $(CaO+ZnO)/BaO$ is 0.3-1.0, further preferably $(CaO+ZnO)/BaO$ is 0.3-0.8.

Furthermore, the optical glass, wherein components thereof are represented by weight percentage, in which: $La_2O_3/(ZnO+Nb_2O_5)$ is 2.0-15.0, preferably $La_2O_3/(ZnO+Nb_2O_5)$ is 2.5-10.0, more preferably $La_2O_3/(ZnO+Nb_2O_5)$ is 3.0-8.0, further preferably $La_2O_3/(ZnO+Nb_2O_5)$ is 3.5-6.0.

Furthermore, the optical glass, wherein components thereof are represented by weight percentage, in which: $(ZnO+Gd_2O_3+Y_2O_3)/CaO$ is below 5.0, preferably $(ZnO+Gd_2O_3+Y_2O_3)/CaO$ is below 4.0, more preferably $(ZnO+Gd_2O_3+Y_2O_3)/CaO$ is 0.2-3.0, further preferably $(ZnO+Gd_2O_3+Y_2O_3)/CaO$ is 0.5-2.0.

Furthermore, the optical glass, wherein components thereof are represented by weight percentage, in which: $SiO_2$ is 3-12%, preferably $SiO_2$ is 5-10%; and/or $B_2O_3$ is 8-17%, preferably $B_2O_3$ is 10-15%; and/or $La_2O_3$ is 31-45%, preferably $La_2O_3$ is 34-40%; and/or $ZrO_2$ is 2-10%, preferably $ZrO_2$ is 3-8%; and/or $TiO_2$ is 8-18%, preferably $TiO_2$ is 11-16%; and/or RO is 10-25%, preferably RO is 11-20%; and/or $Y_2O_3$ is 0-4%, preferably $Y_2O_3$ is 0-2%; and/or $Gd_2O_3$ is 0-4%, preferably $Gd_2O_3$ is 0-2%; and/or $Yb_2O_3$ is 0-3%, preferably $Yb_2O_3$ is 0-1%; and/or $Nb_2O_5$ is 1-10%, preferably $Nb_2O_5$ is 2-7%; and/or ZnO is 1-8%, preferably ZnO is 2-7%; and/or $Rn_2O$ is 0-4%, preferably $Rn_2O$ is 0-2%; and/or $GeO_2$ is 0-3%, preferably $GeO_2$ is 0-1%; and/or $WO_3$ is 0-3%, preferably $WO_3$ is 0-1%; and/or $Ta_2O_5$ is 0-3%, preferably $Ta_2O_5$ is 0-1%; and/or $Al_2O_3$ is 0-3%, preferably $Al_2O_3$ is 0-1%; and/or clarifying agent is 0-0.5%, preferably clarifying agent is 0-0.2%, the RO is total content of MgO, CaO, SrO, and BaO, $Rn_2O$ is one or more of $Li_2O$, $Na_2O$, and $K_2O$, and the clarifying agent is one or more of $Sb_2O_3$, SnO, $SnO_2$, and $CeO_2$.

Furthermore, the optical glass, wherein components thereof are represented by weight percentage, in which: BaO is 5-20%, preferably BaO is 8-18%, more preferably BaO is 11-16%; and/or SrO is 0-10%, preferably SrO is 0-5%, more preferably SrO is 0-2%; and/or CaO is 0-12%, preferably CaO is 1-10%, more preferably CaO is 2-8%; and/or MgO is 0-10%, preferably MgO is 0-5%, more preferably MgO is 0-2%.

Furthermore, the optical glass, wherein components thereof do not contain $WO_3$; and/or do not contain $Ta_2O_5$; and/or do not contain $Rn_2O$; and/or do not contain $Al_2O_3$; and/or do not contain $GeO_2$; and/or do not contain $Y_2O_3$; and/or do not contain $Gd_2O_3$; and/or do not contain SrO; and/or do not contain MgO; and/or do not contain $Yb_2O_3$, and the $Rn_2O$ is one or more of $Li_2O$, $Na_2O$, and $K_2O$.

Furthermore, a refractive index $n_d$ of the optical glass is 1.87-1.93, preferably 1.88-1.92, more preferably 1.89-1.91, and an Abbe number $v_d$ is 28-35, preferably 29-34, more preferably 30-33.

Furthermore, a thermal expansion coefficient $\alpha_{30/70° C.}$ of the optical glass is below $95\times10^{-7}$/K, preferably below $90\times10^{-7}$/K, more preferably below $85\times10^{-7}$/K, further preferably below $80\times10^{-7}$/K; and/or water resistance stability $D_W$ is above Class 2, preferably Class 1; and/or $\lambda_{70}$ is below 420 nm, preferably below 415 nm, more preferably below 410 nm; and/or $\lambda_5$ is below 380 nm, preferably below 375 nm, more preferably below 370 nm; and/or weather resistance CR is above Class 2, preferably Class 1; and/or Knoop hardness $H_K$ is above $580\times10^7$ Pa, preferably above $590\times10^7$ Pa, more preferably above $600\times10^7$ Pa, further preferably above $605\times10^7$ Pa; and/or Young's modulus E is above $10000\times10^7$ Pa, preferably above $10500\times10^7$ Pa, more preferably above $11000\times10^7$ Pa; and/or bubble degree is above Grade A, preferably above Grade $A_0$, more preferably Grade $A_{00}$; and/or density p is below 4.90 g/cm³, preferably below 4.80 g/cm³, more preferably below 4.70 g/cm³, further preferably below 4.60 g/cm³; and/or abrasion degree $F_A$ is 125-165, preferably 130-160, more preferably 135-155; and/or transition temperature $T_g$ is below 700° C., preferably below 690° C., more preferably below 680° C., further preferably below 678° C.

A glass preform is made of the above-mentioned optical glass.

An optical element, made of the above-mentioned optical glass or made of the above-mentioned glass preform.

An optical instrument, comprising the above-mentioned optical glass, and/or comprising the above-mentioned optical element.

The beneficial effects of the present invention are as follows: through rational component design, the optical glass of the present invention has low density while having the desired refractive index and Abbe number, which meets the lightweight application of optical instruments.

DETAILED DESCRIPTION

The implementations of the optical glass provided by the present invention will be described in detail below, but the present invention is not limited to the following implementations. Appropriate changes may be made within the scope of the purpose of the present invention for implementation. In addition, the repeated descriptions will not limit the aim of the invention although with appropriate omissions. In the following, the optical glass of the present invention is sometimes referred to as glass.

<Optical Glass>

Hereinafter, the components (ingredients) of the optical glass provided by the present invention will be described. If not specified herein, the content of each component and the total content are expressed in weight percentage (wt %), that is, the content of each component and the total content are expressed in weight percentage relative to the total glass materials converted into oxide composition. "Converted into oxide composition" therein refers to that the total weight of this oxide is taken as 100% when the oxide, compound salt and hydroxide, used as raw materials for the composition of the optical glass of the present invention, are decomposed and transformed into oxides during melting.

Unless otherwise noted in specific circumstances, the numerical range listed herein includes upper and lower limits, and the words "above" and "below" include the endpoint values as well as all integers and fractions within the range, but not limited to the specific values listed when the range is limited. "And/or" mentioned herein is inclusive. For example, "A and/or B" refers to only A, or only B, or both A and B.

<Necessary Components and Optional Components>

$SiO_2$ has the effect of adjusting the optical constant, improving the chemical stability of the glass, maintaining the viscosity suitable for molten glass, reducing the abrasion degree, and reducing the erosion of refractory materials. The present invention comprises more than 1% of $SiO_2$ to obtain the above effect, and the content of $SiO_2$ is preferably more than 3%, more preferably more than 5%. If the content of $SiO_2$ is too high, the melting difficulty of the glass will increase, and the transition temperature will rise. Therefore, in the present invention, the upper limit of the $SiO_2$ content is 15%, preferably 12%, more preferably 10%.

$B_2O_3$ can increase the melting performance and devitrification resistance of the glass, and is conductive to reducing the transition temperature of the glass. The present invention comprises more than 5% of $B_2O_3$ to obtain the above effect, and the content of $B_2O_3$ is preferably more than 8%, more preferably more than 10%. If the content of $B_2O_3$ is too high, the chemical stability of the glass will deteriorate, especially the water resistance will deteriorate, and the refractive index and light transmittance of the glass will be decreased. Thus, the content of $B_2O_3$ is below 20%, preferably below 17%, more preferably below 15%.

As an effective ingredient for increasing the refractive index of the glass, $La_2O_3$ can significantly improve chemical stability and devitrification resistance of the glass, but the required optical constant is difficult to be achieved when the content of $La_2O_3$ is lower than 25%; when the content of $La_2O_3$ is higher than 50%, the devitrification of the glass is liable to be increased, and the thermal stability will deteriorate. Therefore, the content of $La_2O_3$ is confined to 25-50%, preferably 31-45%, more preferably 34-40%.

$Y_2O_3$ can increase the refractive index and devitrification resistance of the glass. If the content of $Y_2O_3$ exceeds 8%, the chemical stability and weather resistance of the glass will deteriorate. Therefore, the content of $Y_2O_3$ is 0-8%, preferably 0-4%, more preferably 0-2%. In some implementations, it further preferably contains no $Y_2O_3$.

$Gd_2O_3$ can increase the refractive index and chemical stability of the glass. However, if the content of $Gd_2O_3$ exceeds 8%, the devitrification resistance and abrasion degree of the glass will deteriorate. Therefore, the content of $Gd_2O_3$ is 0-8%, preferably 0-4%, more preferably 0-2%. In some implementations, it further preferably contains no $Gd_2O_3$.

$Yb_2O_3$ is also a component which imparts high refractivity and low dispersion performance. If the content of $Yb_2O_3$ exceeds 5%, the anti-devitrification performance of the glass will be decreased. Therefore, the content of $Yb_2O_3$ is 0-5%, preferably 0-3%, more preferably 0-1%, it further preferably contains no $Yb_2O_3$.

$ZrO_2$ can increase the viscosity, hardness, refractive index and chemical stability of the optical glass and also lower the thermal expansion coefficient of the glass; when the content of $ZrO_2$ is too high, the devitrification resistance of the glass is reduced, the melting difficulty is increased, the melting temperature is increased, and the inclusion in the glass and the light transmittance are decreased. Therefore, the content of $ZrO_2$ is 1-12%, preferably 2-10%, more preferably 3-8%.

MgO can effectively reduce the relative partial dispersion of the glass. However, in case of excessive MgO content, the refractive index of the glass is difficult to meet the design requirements, and the anti-devitrification performance and stability of the glass will decrease. Therefore, the content of MgO is confined to 0-10%, preferably 0-5%, more preferably 0-2%. In some implementations, it further preferably contains no MgO.

CaO can adjust the optical constant of the glass, increase the chemical stability of the glass, improve the processing performance of the glass, reduce the high-temperature viscosity and surface tension of the glass, and reduce the difficulty of glass production. If the content of CaO is too high, the devitrification resistance of the glass will be reduced. Therefore, the content of CaO is 0-12%, preferably 1-10%, more preferably 2-8%.

In some implementations, the ratio of the content of CaO to the total content of $SiO_2$ and $ZrO_2$ ($SiO_2+ZrO_2$), i.e., $CaO/(SiO_2+ZrO_2)$, is controlled to be within a range of 0.02-1.0, which can optimize the abrasion degree of the glass and prevent the hardness of the glass from deterioration. Therefore, $CaO/(SiO_2+ZrO_2)$ is preferably 0.02-1.0, $CaO/(SiO_2+ZrO_2)$ is more preferably 0.05-0.8. Furthermore, $CaO/(SiO_2+ZrO_2)$ is controlled to be within a range of 0.1-0.6, which can also further reduce the density of the glass and optimize the weather resistance of the glass. Therefore, $CaO/(SiO_2+ZrO_2)$ is further preferably 0.1-0.6, $CaO/(SiO_2+ZrO_2)$ is more further preferably 0.1-0.5.

SrO can adjust the refractive index and Abbe number in the glass. However, if the content of SrO is too high, the chemical stability and devitrification resistance of the glass will be decreased. Therefore, the content of SrO is confined to 0-10%, preferably 0-5%, more preferably 0-2%. In some implementations, it further preferably contains no SrO.

BaO can increase the refractive index, melting performance and thermal stability of the glass, and improve the abrasion degree and light transmittance of the glass. However, if the content of BaO is too high, the density of the glass will increase and the devitrification resistance will be reduced. Therefore, the content of BaO is 5-20%, preferably 8-18%, more preferably 11-16%.

In some implementations, the ratio of the content of $SiO_2$ to the total content of CaO and BaO (CaO+BaO), i.e., $SiO_2/(CaO+BaO)$, is controlled to be within a range of 0.05-1.5, which can increase the weather resistance of the glass and optimize the abrasion degree of the glass. Therefore, $SiO_2/(CaO+BaO)$ is preferably 0.05-1.5, $SiO_2/(CaO+BaO)$ is more preferably 0.1-1.0. Furthermore, $SiO_2/(CaO+BaO)$ is controlled to be within a range of 0.2-0.85, which can also further increase the Young's modulus of the glass and optimize the thermal expansion coefficient of the glass. Therefore, $SiO_2/(CaO+BaO)$ is further preferably 0.2-0.85, $SiO_2/(CaO+BaO)$ is more further preferably 0.35-0.75.

In some implementations, the total content RO of alkaline-earth metal oxides MgO, CaO, SrO, and BaO is controlled to be within a range of 6-35%, and the glass is easier to obtain the desired optical constant, optimize the chemical stability of the glass, and prevent the devitrification resistance of the glass from reduction. Therefore, RO is preferably 6-35%, more preferably 10-25%, further preferably 11-20%.

ZnO can adjust the refractive index and dispersion of the glass, and reduce the high-temperature viscosity and transition temperature of the glass. If the content of ZnO is too high, the devitrification resistance of the glass will deteriorate. Therefore, the content of ZnO is 0-10%, preferably 1-8%, more preferably 2-7%.

In some implementations, the ratio of the total content of CaO and ZnO (CaO+ZnO) to the content of BaO, i.e., (CaO+ZnO)/BaO, is controlled to be within a range of 0.1-3.0, which can increase the light transmittance of the glass and meanwhile prevent the density of the glass from increasing. Therefore, (CaO+ZnO)/BaO is preferably 0.1-3.0, and (CaO+ZnO)/BaO is more preferably 0.2-2.0. Furthermore, (CaO+ZnO)/BaO is controlled to be within a range of 0.3-1.0, which can also further increase the bubble degree of the glass and prevent the Young's modulus of the glass from deterioration. Therefore, (CaO+ZnO)/BaO is further preferably 0.3-1.0, and (CaO+ZnO)/BaO is more further preferably 0.3-0.8.

In some implementations, the ratio of the total content of ZnO, $Gd_2O_3$, and $Y_2O_3$ ($ZnO+Gd_2O_3+Y_2O_3$) to the content of CaO, i.e., $(ZnO+Gd_2O_3+Y_2O_3)/CaO$ is controlled to be below 5.0, which can reduce the thermal expansion coefficient of the glass and prevent the weather resistance from reduction. Thus, $(ZnO+Gd_2O_3+Y_2O_3)/CaO$ is preferably below 5.0, and $(ZnO+Gd_2O_3+Y_2O_3)/CaO$ is more preferably below 4.0. Furthermore, $(ZnO+Gd_2O_3+Y_2O_3)/CaO$ is controlled to be within a range of 0.2-3.0, which can further optimize the bubble degree and hardness of the glass. Therefore, $(ZnO+Gd_2O_3+Y_2O_3)/CaO$ is further preferably 0.2-3.0, and $(ZnO+Gd_2O_3+Y_2O_3)/CaO$ is more further preferably 0.5-2.0.

$TiO_2$ can increase the refractive index and dispersion of the glass, and improve the devitrification resistance of the glass, but over-high content will greatly reduce the dispersion coefficient and devitrification tends to increase, or even significantly increase the staining degree of the glass. Therefore, the content of $TiO_2$ is confined to 5-20%, preferably 8-18%, more preferably 11-16%.

In some implementations, the ratio of the content of $TiO_2$ to the total content of $La_2O_3$ and ZnO ($La_2O_3+ZnO$), i.e., $TiO_2/(La_2O_3+ZnO)$, is controlled to be within a range of 0.1-0.6, which can reduce the transition temperature of the glass and meanwhile prevent the light transmittance of the glass from reduction. Therefore, $TiO_2/(La_2O_3+ZnO)$ is preferably 0.1-0.6, and $TiO_2/(La_2O_3+ZnO)$ is more preferably 0.15-0.55. Furthermore, $TiO_2/(La_2O_3+ZnO)$ is controlled to be within a range of 0.2-0.5, which can also further increase the Young's modulus of the glass and optimize the abrasion degree. Therefore, $TiO_2/(La_2O_3+ZnO)$ is further preferably 0.2-0.5, and $TiO_2/(La_2O_3+ZnO)$ is more further preferably 0.25-0.45.

In some implementations, the ratio of the content of $TiO_2$ to the content of BaO, i.e., $TiO_2/BaO$, is controlled to be within a range of 0.3-3.0, which can increase the Young's modulus of the glass and prevent the thermal expansion coefficient from increasing. Therefore, $TiO_2/BaO$ is preferably 0.3-3.0, and $TiO_2/BaO$ is more preferably 0.4-2.0. Furthermore, $TiO_2/BaO$ is controlled to be within a range of 0.6-1.5, which can also further increase the hardness and chemical stability of the glass. Therefore, $TiO_2/BaO$ is further preferably 0.6-1.5, and $TiO_2/BaO$ is more further preferably 0.8-1.3.

$Nb_2O_5$ is a high-refractivity high-dispersion component, can increase the refractive index and devitrification resistance of the glass, and reduce the thermal expansion coefficient of the glass. If the content of $Nb_2O_5$ exceeds 12%, the thermal stability and weather resistance of the glass will be reduced and the light transmittance will be decreased. Therefore, the content of $Nb_2O_5$ in the present invention is 0-12%, preferably 1-10%, more preferably 2-7%.

In some implementations, the ratio of the content of BaO to the content of $Nb_2O_5$, i.e., $BaO/Nb_2O_5$, is controlled to be above 0.8, which can increase the light transmittance and chemical stability of the glass. Therefore, $BaO/Nb_2O_5$ is preferably above 0.8, and $BaO/Nb_2O_5$ is more preferably 1.0-20.0. Furthermore, $BaO/Nb_2O_5$ is controlled to be within a range of 1.5-10.0, which can further reduce the thermal expansion coefficient and transition temperature of the glass. Therefore, $BaO/Nb_2O_5$ is further preferably 1.5-10.0, and $BaO/Nb_2O_5$ is more further preferably 2.0-5.0.

In some implementations, the ratio of the content of $La_2O_3$ to the total content of ZnO and $Nb_2O_5(ZnO+Nb_2O_5)$, i.e., $La_2O_3/(ZnO+Nb_2O_5)$, is controlled to be within a range of 2.0-15.0, which can increase the bubble degree of the glass and reduce the transition temperature of the glass. Therefore, $La_2O_3/(ZnO+Nb_2O_5)$ is preferably 2.0-15.0, and $La_2O_3/(ZnO+Nb_2O_5)$ is more preferably 2.5-10.0. Furthermore, $La_2O_3/(ZnO+Nb_2O_5)$ is controlled to be within a range of 3.0-8.0, which can also further optimize the density and abrasion degree of the glass. Therefore, $La_2O_3/(ZnO+Nb_2O_5)$ is further preferably 3.0-8.0, and $La_2O_3/(ZnO+Nb_2O_5)$ is more further preferably 3.5-6.0.

$Ta_2O_5$ has the effect of increasing the refractive index and enhancing the devitrification resistance of the glass. However, if the content of $Ta_2O_5$ is too high, the thermal stability of the glass will be decreased, the density will be increased, and the optical constant is difficult to be controlled within the desired range; on the other hand, compared with other ingredients, the price of $Ta_2O_5$ is very expensive, and from the perspective of practicality and cost, the usage amount of $Ta_2O_5$ should be minimized. Therefore, the content of $Ta_2O_5$ is confined to 0-5%, preferably 0-3%, more preferably 0-1%. In some implementations, it further preferably contains no $Ta_2O_5$.

Alkali metal oxide $Rn_2O$ ($Rn_2O$ is one or more of $Li_2O$, $Na_2O$, and $K_2O$) can reduce the transition temperature of the glass, adjust the optical constant and high-temperature viscosity of the glass, and improve the melting performance of the glass. However, when the content of $Rn_2O$ is high, the devitrification resistance and chemical stability of the glass will be reduced and the refractive index will be reduced. Therefore, the content of $Rn_2O$ is 0-8%, preferably 0-4%, more preferably 0-2%. In some implementations, it further preferably contains no $Rn_2O$.

$WO_3$ can increase the refractive index and mechanical strength of the glass. If the content of $WO_3$ exceeds 5%, the thermal stability of the glass will decrease, and the devitrification resistance will reduce. Therefore, the upper limit of the $WO_3$ content is 5%, preferably 3%, more preferably 1%. In some implementations, it further preferably contains no $WO_3$.

$Al_2O_3$ can improve the chemical stability of the glass, but when the content of $Al_2O_3$ exceeds 5%, the melting performance and light transmittance of the glass will deteriorate. Therefore, the content of $Al_2O_3$ is 0-5%, preferably 0-3%, more preferably 0-1%. In some implementations, it further preferably contains no $Al_2O_3$.

$GeO_2$ has the effect of increasing the refractive index and devitrification resistance of the glass, but if the content of $GeO_2$ is too high, the chemical stability of the glass will be decreased; on the other hand, compared with other ingredients, the price of $GeO_2$ is very expensive, and from the perspective of practicality and cost, the usage amount of $GeO_2$ should be minimized. Therefore, the content of $GeO_2$ in the present invention is confined to 0-5%, preferably 0-3%, more preferably 0-1%, it further preferably contains no $GeO_2$.

By comprising one or more components of 0-1% of $Sb_2O_3$, SnO, $SnO_2$, and $CeO_2$ as clarifying agent in the present invention, it can increase the clarifying effect of the glass and improve the bubble degree of the glass. The content of the clarifying agent is preferably 0-0.5%, and the content of clarifying agent is more preferably 0-0.2%. Due to the reasonable design of component type and content as well as excellent bubble degree of the optical glass provided by the present invention, it further preferably contains 0% clarifying agent in some implementations. When the content of $Sb_2O_3$ exceeds 1%, the glass has a tendency to clarify the performance degradation, and meanwhile, because of its strong oxidation, it promotes the corrosion of platinum or platinum alloy vessel for melting glass and the deterioration of the molding mould. Therefore, the content of $Sb_2O_3$ in the present invention is preferably 0-1%, more preferably 0-0.5%, further preferably 0-0.2%, and more further preferably 0%. SnO and $SnO_2$ can also be used as clarifying agents, but when the content of SnO and $SnO_2$ exceeds 1%, the glass coloring tendency will increase, or when the glass is reformed by heating, softening and die pressing, Sn will become the starting point for crystal nuclei generation, resulting in a tendency to produce devitrification. Therefore, the content of $SnO_2$ in the present invention is preferably 0-1%, more preferably 0-0.5%, further preferably 0-0.2%, more further preferably 0%; the content of SnO is preferably 0-1%, more preferably 0-0.5%, further preferably 0-0.2%, more further preferably 0%. The role and content proportion of $CeO_2$ are consistent with $SnO_2$, so the content of $CeO_2$ is preferably 0-1%, more preferably 0-0.5%, further preferably 0-0.2%, more further preferably 0%.

<Unnecessary Components>

In the glass of the present invention, for the transition metal oxides such as V, Cr, Mn, Fe, Co, Ni, Cu, Ag and Mo, even if they are contained in small amounts in a single or compound form, the glass could be colored and absorb at a specific wavelength in the visible light region, thereby impairing the properties of the present invention in increasing the visible light transmittance, and therefore, in particular, for optical glass with requirement on wavelength transmittance in the visible region, it is preferably not actually included.

Th, Cd, Tl, Os, Be and Se oxides have been used in a controlled manner as a harmful chemical substance in recent years, which is necessary not only in the glass manufacturing process, but also in the processing procedure and disposal after the productization for environmental protection measures. Therefore, in the case of attaching importance to the influence on the environment, it is preferably not actually included except for the inevitable incorporation. As a result, the optical glass does not actually contain a substance that contaminates the environment. Therefore, the optical glass of the present invention can be manufactured, processed, and discarded even if a measure is not taken as a special environmental countermeasure.

In order to achieve environmental friendliness, the optical glass of the present invention preferably does not contain $As_2O_3$ and PbO.

The terms "not contained" and "0%" as used herein mean that the compound, molecule or element and the like are not intentionally added to the optical glass of the present invention as raw materials; however, as raw materials and/or equipment for the production of optical glass, there will be some impurities or components that are not intentionally added in small or trace amounts in the final optical glass, and this situation also falls within the protection scope of the present invention patent.

Hereinafter, the performance of the optical glass provided by the present invention will be described.

<Refractive Index and Abbe Number>

The refractive index ($n_d$) and Abbe number ($v_d$) of the optical glass is tested as per the method specified in GB T 7962.1-2010.

In some implementations, the lower limit of the refractive index ($n_d$) of the optical glass provided by the present invention is 1.87, preferably 1.88, more preferably 1.89.

In some implementations, the upper limit of the refractive index ($n_d$) of the optical glass provided by the present invention is 1.93, preferably 1.92, more preferably 1.91.

In some implementations, the lower limit of the Abbe number ($v_d$) of the optical glass provided by the present invention is 28, preferably 29, more preferably 30.

In some implementations, the upper limit of the Abbe number ($v_d$) of the optical glass provided by the present invention is 35, preferably 34, more preferably 33.

<Thermal Expansion Coefficient>

The thermal expansion coefficient ($\alpha_{30/70°~C.}$) of the optical glass is tested at $-30\sim70°$ C. as per the method specified in GB T 7962.16-2010.

In some implementations, the thermal expansion coefficient (($\alpha_{30/70°~C.}$) of the optical glass provided by the present invention is below $95\times10^{-7}$/K, preferably below $90\times10^{-7}$/K, more preferably below $85\times10^{-7}$/K, further preferably below $80\times10^{-7}$/K.

<Water Resistance Stability>

The water resistance stability ($D_W$) (powder method) of the optical glass is tested as per the method specified in GB/T 17129.

In some implementations, the water resistance stability ($D_W$) of the optical glass provided by the present invention is above Class 2, preferably Class 1.

<Staining Degree>

The short-wave transmission spectrum characteristics of the glass provided by the present invention are represented by staining degree ($\lambda_{70}$ and $\lambda_5$). $\lambda_{70}$ refers to a wavelength corresponding to a glass transmittance of 70%. The measurement of $\lambda_{70}$ is carried out using a glass having a thickness of $10\pm0.1$ mm with two opposing planes parallel to each other and optically polished, measuring the spectral transmittance in the wavelength region from 280 nm to 700 nm and a wavelength exhibiting 70% of the transmittance. The spectral transmittance or transmittance is an amount indicated by $I_{in}$ in the case where the light of an intensity $I_{in}$ is incident perpendicularly to the above surface of the glass, passes through the glass and passes an amount represented by $I_{out}/I_{in}$ while emitting the light of an intensity $I_{out}$ from a plane, and includes the transmittance of the surface reflection loss on the above surface of the glass. The higher the refractive index of the glass is, the greater the surface reflection loss becomes. Therefore, in the glass with high refractive index, a small value of $\lambda_{70}$ means that the glass itself is colored very little and the light transmittance is high.

In some implementations, $\lambda_{70}$ of the optical glass provided by the present invention is below 420 nm, preferably below 415 nm, more preferably below 410 nm.

In some implementations, $\lambda_5$ of the optical glass provided by the present invention is below 380 nm, preferably below 375 nm, more preferably below 370 nm.

<Weather Resistance>

The weather resistance (CR) test method of the optical glass is as follows: place the sample in a test chamber in a saturated water vapor environment with a relative humidity of 90%, and cycle alternately at 40-50° C. every 1 h for 15 cycles. The weather resistance is classified according to the turbidity change before and after the sample placement. The classification of weather resistance is shown in Table 1:

TABLE 1

| | Category | | | | | |
|---|---|---|---|---|---|---|
| | | | | | 4 | |
| | 1 | 2 | 3 | a | b | C |
| Turbidity increase $\Delta H$ (%) | <0.3 | 0.3-1.0 | 1.0-2.0 | 2.0-4.0 | 4.0-6.0 | ≥6.0 |

In some implementations, the weather resistance (CR) of the optical glass provided by the present invention is above Class 2, preferably Class 1.

<Knoop Hardness>

The Knoop hardness ($H_K$) of the optical glass is tested according to the method specified in GB T7962.18-2010.

In some implementations, the Knoop hardness ($H_K$) of the optical glass provided by the present invention is above $580\times10^7$ Pa, preferably above $590\times10^7$ Pa, more preferably above $600\times10^7$ Pa, further preferably above $605\times10^7$ Pa.

<Young's Modulus>

The Young's modulus (E) is tested by ultrasonic wave for P-wave velocity and S-wave velocity, and then calculated according to the following formula.

$$E = \frac{4G^2 - 3GV_T^2\rho}{G - V_T^2\rho}$$

$$G = V_S^2\rho$$

Wherein: E refers to Young's modulus, Pa;

G refers to shear modulus, Pa;

$V_T$ refers to S-wave velocity, m/s;

$V_S$ refers to P-wave velocity, m/s;

$\rho$ refers to glass density, g/cm$^3$.

In some implementations, Young's modulus (E) of the optical glass provided by the present invention is above $10000\times10^7$ Pa, preferably above $10500\times10^7$ Pa, more preferably above $11000\times10^7$ Pa.

<Bubble Degree>

The bubble degree of the optical glass is tested as per the method specified in GB T7962.8-2010.

In some implementations, the bubble degree of the optical glass provided by the present invention is above Grade A, preferably above Grade $A_0$, more preferably Grade $A_{00}$.

<Density>

The density ($\rho$) of the optical glass is tested as per the method specified in GB T7962.20-2010.

In some implementations, the density ($\rho$) of the optical glass provided by the present invention is below 4.90 g/cm$^3$, preferably below 4.80 g/cm$^3$, more preferably below 4.70 g/cm$^3$, further preferably below 4.60 g/cm$^3$.

<Abrasion Degree>

Abrasion degree ($F_A$) of optical glass refers to the data obtained by the ratio of the abrasion quantity of sample to the abrasion quantity (volume) of the standard sample (H-K9 optical glass) multiplying by 100 with the formula below under exactly the same conditions:

$$F_A = V/V_0 \times 100 = (W/\rho)/(W_0/\rho_0) \times 100$$

Wherein: V—volume abrasion quantity of the tested sample;

$V_0$—volume abrasion quantity of the standard sample;

W—mass abrasion quantity of the tested sample;

$W_0$—mass abrasion quantity of the standard sample;

$\rho$—density of the tested sample;

$\rho_0$—density of the standard sample.

In some implementations, the lower limit of the abrasion degree ($F_A$) of the optical glass provided by the present invention is 125, preferably 130, more preferably 135.

In some implementations, the upper limit of the abrasion degree ($F_A$) of the optical glass provided by the present invention is 165, preferably 160, more preferably 155.

<Transition Temperature>

The transition temperature ($T_g$) of the optical glass is tested as per the method specified in GB T7962.16-2010.

In some implementations, the transition temperature ($T_g$) of the optical glass provided by the present invention is below 700° C., preferably below 690° C., more preferably below 680° C., further preferably below 678° C.

[Manufacturing Method of Optical Glass]

The manufacturing method of the optical glass provided by the present invention is as follows: the glass of the present invention is made of conventional raw materials and processes, including but not limited to using oxide, hydroxide, compound salt (e.g., carbonate, nitrate, and sulfate), and boric acid as raw materials, mixing the ingredients according to the conventional method, and then feeding the mixed furnace burden into a 1200-1500° C. smelting furnace (e.g., platinum or platinum alloy crucible) for melting, obtaining homogeneous molten glass without bubbles and undissolved substances after clarification and homogenization, shaping the molten glass in a mould, and performing annealing. Those skilled in the art can appropriately select raw materials, process methods and process parameters according to actual needs.

[Glass Preform and Optical Element]

The glass preform can be made from the optical glass formed by, for example, direct drop forming, grinding or thermoforming, and other compression molding means. That is to say, the precision glass preform can be made by direct precision drop molding of molten optical glass, or glass preform can be made by grinding and other machining methods, or the glass preform can be made by making a preform for compression molding with the optical glass, re-thermoforming this preform, and then grinding the preform. It should be noted that the means for preparing glass preform is not limited to the above means.

As mentioned above, the optical glass of the present invention is useful for various optical elements and optical designs, wherein the particularly preferred method is to form a preform by the optical glass of the present invention, and use this preform for re-thermoforming, precision stamping and the like to make optical elements such as lens and prism.

The glass preform and the optical element of the present invention are both formed by the optical glass of the present invention described above. The glass preform of the present invention has excellent characteristics of the optical glass; the optical element of the present invention has excellent characteristics of the optical glass, and can provide such optical elements as a variety of lenses and prisms having a high optical value.

Examples of the lens include various lenses with spherical or aspheric surfaces, such as concave meniscus lens, convex meniscus lens, biconvex lens, biconcave lens, planoconvex lens and planoconcave lens.

[Optical Instrument]

The optical element formed by the optical glass of the present invention can make optical instruments such as photographic equipment, camera equipment, projector equipment, display equipment, on-board equipment and monitoring equipment.

Embodiment

<Optical Glass Embodiment>

The following non-limiting embodiments are provided in order to further clearly explain and illustrate the technical solution of the present invention.

This embodiment obtains the optical glass with composition as shown in Table 2-Table 4 by the manufacturing method of the above-mentioned optical glass. In addition, the characteristics of each glass are measured by the test method described in the present invention, and the measurement results are shown in Tables 2 to 4.

TABLE 2

| | Embodiment (wt %) | | | | | | | |
|---|---|---|---|---|---|---|---|---|
| | 1# | 2# | 3# | 4# | 5# | 6# | 7# | 8# |
| $SiO_2$ | 2.37 | 4.16 | 10.42 | 9.33 | 13.2 | 6.13 | 3.35 | 11.25 |
| $B_2O_3$ | 18.12 | 16.34 | 10.54 | 6.7 | 8.56 | 10.45 | 11.23 | 7.74 |
| $La_2O_3$ | 27.34 | 48.02 | 34.47 | 45.85 | 27.23 | 32 | 46.94 | 31.47 |
| $Y_2O_3$ | 0 | 1.2 | 0 | 2.5 | 0 | 0.5 | 0 | 3.2 |
| $Gd_2O_3$ | 0.4 | 0 | 0 | 0 | 0 | 1.2 | 0 | 0 |
| $Yb_2O_3$ | 0 | 0 | 0 | 0 | 0 | 0 | 0 | 0 |
| $ZrO_2$ | 10.72 | 2.24 | 1.85 | 4.35 | 9.23 | 8.18 | 3.52 | 4.17 |
| $Nb_2O_5$ | 2.8 | 5.23 | 3.14 | 3.87 | 1.25 | 3.42 | 2.85 | 9.3 |
| $TiO_2$ | 10.23 | 6.72 | 8.45 | 12.2 | 18.25 | 11.35 | 9.26 | 13.2 |
| $Ta_2O_5$ | 0 | 0 | 1 | 0.5 | 0 | 0 | 0 | 0 |
| MgO | 0 | 0 | 0 | 0 | 0 | 0 | 0 | 0 |
| CaO | 9.2 | 4.23 | 11.4 | 1.35 | 2.26 | 4.5 | 3.6 | 5.2 |
| SrO | 0 | 0 | 0 | 0 | 0 | 0 | 0 | 0 |
| BaO | 17.32 | 7.66 | 18.13 | 9.45 | 10.6 | 15.38 | 13.7 | 8.85 |
| $Li_2O$ | 0 | 0 | 0 | 0 | 1.1 | 0 | 0.4 | 0 |
| $Na_2O$ | 0 | 2 | 0 | 0.6 | 0 | 0 | 0 | 0 |
| $K_2O$ | 0 | 0 | 0 | 0 | 0 | 0.55 | 0 | 0 |
| $WO_3$ | 0 | 0 | 0.5 | 0 | 0 | 0 | 0 | 0 |
| ZnO | 1.4 | 2.2 | 0 | 3.3 | 8.12 | 6.24 | 4.15 | 5.62 |

TABLE 2-continued

| | Embodiment (wt %) | | | | | | | |
|---|---|---|---|---|---|---|---|---|
| | 1# | 2# | 3# | 4# | 5# | 6# | 7# | 8# |
| $Al_2O_3$ | 0 | 0 | 0 | 0 | 0 | 0 | 1 | 0 |
| $GeO_2$ | 0 | 0 | 0 | 0 | 0 | 0 | 0 | 0 |
| $Sb_2O_3$ | 0.1 | 0 | 0.1 | 0 | 0 | 0 | 0 | 0 |
| SnO | 0 | 0 | 0 | 0 | 0 | 0 | 0 | 0 |
| $SnO_2$ | 0 | 0 | 0 | 0 | 0.2 | 0.1 | 0 | 0 |
| $CeO_2$ | 0 | 0 | 0 | 0 | 0 | 0 | 0 | 0 |
| | | | | | | | | |
| Total | 100 | 100 | 100 | 100 | 100 | 100 | 100 | 100 |
| RO | 26.52 | 11.89 | 29.53 | 10.8 | 12.86 | 19.88 | 17.3 | 14.05 |
| $CaO/(SiO_2 + ZrO_2)$ | 0.703 | 0.661 | 0.929 | 0.099 | 0.101 | 0.314 | 0.524 | 0.337 |
| $TiO_2/BaO$ | 0.591 | 0.877 | 0.466 | 1.291 | 1.722 | 0.738 | 0.676 | 1.492 |
| $TiO_2/(La_2O_3 + ZnO)$ | 0.356 | 0.134 | 0.245 | 0.248 | 0.516 | 0.297 | 0.181 | 0.356 |
| $SiO_2/(CaO + BaO)$ | 0.089 | 0.35 | 0.353 | 0.864 | 1.026 | 0.308 | 0.194 | 0.801 |
| $BaO/Nb_2O_5$ | 6.186 | 1.465 | 5.774 | 2.442 | 8.48 | 4.497 | 4.807 | 0.952 |
| $(CaO + ZnO)/BaO$ | 0.612 | 0.839 | 0.629 | 0.492 | 0.979 | 0.698 | 0.567 | 1.223 |
| $La_2O_3/(ZnO + Nb_2O_5)$ | 6.51 | 6.463 | 10.978 | 6.395 | 2.906 | 3.313 | 6.706 | 2.109 |
| $(ZnO + Gd_2O_3 + Y_2O_3)/CaO$ | 0.196 | 0.804 | 0 | 4.296 | 3.593 | 1.764 | 1.153 | 1.696 |
| $n_d$ | 1.8753 | 1.9245 | 1.8923 | 1.9263 | 1.8845 | 1.8876 | 1.9158 | 1.8905 |
| $v_d$ | 32.38 | 34.26 | 34.55 | 31.43 | 29.15 | 30.32 | 29.57 | 28.75 |
| $D_W$ | Class 1 | Class 1 | Class 1 | Class 1 | Class 1 | Class 1 | Class 1 | Class 1 |
| CR | Class 1 | Class 1 | Class 1 | Class 1 | Class 1 | Class 1 | Class 1 | Class 1 |
| $H_K(\times 10^7 Pa)$ | 602 | 611 | 604 | 606 | 605 | 608 | 607 | 611 |
| $F_A$ | 155 | 158 | 157 | 137 | 156 | 148 | 142 | 134 |
| $E(\times 10^7 Pa)$ | 11231 | 11434 | 11502 | 11367 | 11323 | 11583 | 11543 | 11528 |
| $\rho(g/cm^3)$ | 4.58 | 4.57 | 4.62 | 4.57 | 4.56 | 4.54 | 4.52 | 4.63 |
| $\lambda_{70}(nm)$ | 402 | 407 | 408 | 405 | 410 | 402 | 410 | 411 |
| $\lambda_5(nm)$ | 363 | 368 | 368 | 364 | 370 | 360 | 361 | 370 |
| Bubble degree (level) | $A_{00}$ | $A_{00}$ | $A_0$ | $A_{00}$ | $A_{00}$ | $A_{00}$ | $A_{00}$ | $A_0$ |
| $\alpha_{-30/70°\,C.}(\times 10^{-7}/K)$ | 82 | 78 | 83 | 79 | 83 | 74 | 78 | 77 |
| $T_g(°C.)$ | 678 | 680 | 682 | 671 | 670 | 672 | 679 | 681 |

TABLE 3

| | Embodiment (wt %) | | | | | | | |
|---|---|---|---|---|---|---|---|---|
| | 9# | 10# | 11# | 12# | 13# | 14# | 15# | 16# |
| $SiO_2$ | 10.46 | 8.3 | 7.12 | 6.56 | 9.04 | 7.28 | 6.44 | 5.82 |
| $B_2O_3$ | 5.26 | 12.2 | 11.75 | 10.64 | 14.32 | 15.8 | 9.45 | 11.23 |
| $La_2O_3$ | 27.88 | 39.03 | 31.55 | 39.54 | 26.38 | 27.65 | 41.4 | 41.95 |
| $Y_2O_3$ | 0 | 0 | 1.3 | 0 | 0 | 0 | 0 | 0 |
| $Gd_2O_3$ | 2.5 | 0 | 0 | 0 | 0 | 0 | 0 | 0 |
| $Yb_2O_3$ | 0 | 0 | 0 | 0 | 0 | 0 | 0 | 0 |
| $ZrO_2$ | 7.02 | 5.65 | 6.32 | 4.48 | 7.22 | 6.34 | 5.25 | 4.82 |
| $Nb_2O_5$ | 8.25 | 4.6 | 5.25 | 6.18 | 3.27 | 7.2 | 5.33 | 4.62 |
| $TiO_2$ | 15.34 | 14.4 | 16.2 | 11.43 | 10.28 | 14.5 | 12.53 | 13.7 |
| $Ta_2O_5$ | 0 | 0 | 0 | 0 | 0 | 0 | 0 | 0 |
| MgO | 0 | 0 | 0 | 1.2 | 0 | 0 | 0 | 0 |
| CaO | 7.33 | 4.32 | 3.75 | 2.64 | 8.13 | 5.16 | 3.37 | 3.26 |
| SrO | 0 | 0 | 0 | 0 | 0 | 0 | 0 | 0 |
| BaO | 14.26 | 11.5 | 12.53 | 14.62 | 16.6 | 12.25 | 13.06 | 11.77 |
| $Li_2O$ | 0 | 0 | 0 | 0 | 0 | 0 | 0 | 0 |
| $Na_2O$ | 0 | 0 | 0 | 0 | 0 | 0 | 0 | 0 |
| $K_2O$ | 0 | 0 | 0 | 0 | 0 | 0 | 0 | 0 |
| $WO_3$ | 1 | 0 | 0 | 0 | 0 | 0 | 0 | 0 |
| ZnO | 0.7 | 0 | 3.63 | 2.71 | 4.66 | 3.82 | 3.17 | 2.63 |
| $Al_2O_3$ | 0 | 0 | 0.5 | 0 | 0 | 0 | 0 | 0 |
| $GeO_2$ | 0 | 0 | 0 | 0 | 0 | 0 | 0 | 0 |
| $Sb_2O_3$ | 0 | 0 | 0 | 0 | 0 | 0 | 0 | 0 |
| SnO | 0 | 0 | 0.1 | 0 | 0 | 0 | 0 | 0 |
| $SnO_2$ | 0 | 0 | 0 | 0 | 0.1 | 0 | 0 | 0.2 |
| $CeO_2$ | 0 | 0 | 0 | 0 | 0 | 0 | 0 | 0 |
| | | | | | | | | |
| Total | 100 | 100 | 100 | 100 | 100 | 100 | 100 | 100 |
| RO | 21.59 | 15.82 | 16.28 | 18.46 | 24.73 | 17.41 | 16.43 | 15.03 |
| $CaO/(SiO_2 + ZrO_2)$ | 0.419 | 0.31 | 0.279 | 0.239 | 0.5 | 0.379 | 0.288 | 0.306 |
| $TiO_2/BaO$ | 1.076 | 1.252 | 1.293 | 0.782 | 0.619 | 1.184 | 0.959 | 1.164 |
| $TiO_2/(La_2O_3 + ZnO)$ | 0.537 | 0.369 | 0.46 | 0.271 | 0.331 | 0.461 | 0.281 | 0.307 |
| $SiO_2/(CaO + BaO)$ | 0.484 | 0.525 | 0.437 | 0.38 | 0.366 | 0.418 | 0.392 | 0.387 |
| $BaO/Nb_2O_5$ | 1.728 | 2.5 | 2.387 | 2.366 | 5.076 | 1.701 | 2.45 | 2.548 |
| $(CaO + ZnO)/BaO$ | 0.563 | 0.376 | 0.589 | 0.366 | 0.77 | 0.733 | 0.501 | 0.5 |
| $La_2O_3/(ZnO + Nb_2O_5)$ | 3.115 | 8.485 | 3.553 | 4.448 | 3.327 | 2.509 | 4.871 | 5.786 |

TABLE 3-continued

| | Embodiment (wt %) | | | | | | | |
| --- | --- | --- | --- | --- | --- | --- | --- | --- |
| | 9# | 10# | 11# | 12# | 13# | 14# | 15# | 16# |
| $(ZnO + Gd_2O_3 + Y_2O_3)/CaO$ | 0.437 | 0 | 1.315 | 1.027 | 0.573 | 0.74 | 0.941 | 0.807 |
| $n_d$ | 1.8914 | 1.9013 | 1.9042 | 1.9105 | 1.9033 | 1.9071 | 1.9084 | 1.8958 |
| $v_d$ | 28.36 | 29.82 | 29.04 | 31.37 | 33.26 | 30.85 | 31.22 | 31.78 |
| $D_W$ | Class 1 | Class 1 | Class 1 | Class 1 | Class 1 | Class 1 | Class 1 | Class 1 |
| CR | Class 1 | Class 1 | Class 1 | Class 1 | Class 1 | Class 1 | Class 1 | Class 1 |
| $H_K (\times 10^7 Pa)$ | 608 | 610 | 612 | 615 | 613 | 615 | 611 | 614 |
| $F_A$ | 135 | 137 | 143 | 145 | 142 | 140 | 145 | 147 |
| $E (\times 10^7 Pa)$ | 11692 | 11794 | 11831 | 11658 | 11763 | 11793 | 11832 | 11796 |
| $\rho (g/cm^3)$ | 4.52 | 4.58 | 4.56 | 4.55 | 4.52 | 4.60 | 4.54 | 4.52 |
| $\lambda_{70}(nm)$ | 402 | 401 | 400 | 398 | 396 | 395 | 400 | 400 |
| $\lambda_5 (nm)$ | 362 | 360 | 358 | 357 | 355 | 355 | 361 | 360 |
| Bubble degree (level) | $A_{00}$ | $A_0$ | $A_{00}$ | $A_{00}$ | $A_{00}$ | $A_0$ | $A_{00}$ | $A_{00}$ |
| $\alpha_{-30/70°\ C.}(\times 10^{-7}/K)$ | 78 | 80 | 73 | 75 | 76 | 77 | 75 | 73 |
| $T_g(° C.)$ | 683 | 680 | 674 | 672 | 673 | 684 | 673 | 670 |

TABLE 4

| | Embodiment (wt %) | | | | | | | |
| --- | --- | --- | --- | --- | --- | --- | --- | --- |
| | 17# | 18# | 19# | 20# | 21# | 22# | 23# | 24# |
| $SiO_2$ | 12.2 | 7.32 | 8.24 | 8.18 | 9.27 | 6.54 | 7.55 | 8.62 |
| $B_2O_3$ | 13.65 | 14.02 | 10.23 | 11.73 | 12.64 | 12.32 | 11.72 | 13.5 |
| $La_2O_3$ | 32.88 | 36.84 | 38.07 | 34.14 | 35.54 | 36.45 | 39.65 | 37.24 |
| $Y_2O_3$ | 0 | 0 | 0 | 0 | 0 | 0 | 0 | 0 |
| $Gd_2O_3$ | 0 | 0 | 0 | 0 | 0 | 0 | 0 | 0 |
| $Yb_2O_3$ | 0 | 0 | 0 | 0 | 0 | 0 | 0 | 0 |
| $ZrO_2$ | 5.12 | 4.83 | 6.34 | 5.72 | 4.91 | 6.72 | 5.17 | 6.23 |
| $Nb_2O_5$ | 3.5 | 4.21 | 5.05 | 6.24 | 5.12 | 4.53 | 3.7 | 2.88 |
| $TiO_2$ | 11.93 | 12.27 | 13.06 | 14.58 | 13.64 | 12.9 | 12.56 | 13.45 |
| $Ta_2O_5$ | 0 | 0 | 0 | 0 | 0 | 0 | 0 | 0 |
| MgO | 0 | 0 | 0 | 0 | 0 | 0 | 0 | 0 |
| CaO | 4.03 | 2.74 | 2.88 | 3.42 | 3.5 | 4.24 | 3.18 | 2.44 |
| SrO | 0 | 0 | 0 | 0 | 0 | 0 | 0 | 0 |
| BaO | 14.24 | 13.74 | 12.56 | 11.84 | 12.75 | 13.82 | 12.72 | 12.5 |
| $Li_2O$ | 0 | 0 | 0 | 0 | 0 | 0 | 0 | 0 |
| $Na_2O$ | 0 | 0 | 0 | 0 | 0 | 0 | 0 | 0 |
| $K_2O$ | 0 | 0 | 0 | 0 | 0 | 0 | 0 | 0 |
| $WO_3$ | 0 | 0 | 0 | 0 | 0 | 0 | 0 | 0 |
| ZnO | 2.45 | 4.03 | 3.47 | 4.15 | 2.63 | 2.48 | 3.75 | 3.14 |
| $Al_2O_3$ | 0 | 0 | 0 | 0 | 0 | 0 | 0 | 0 |
| $GeO_2$ | 0 | 0 | 0 | 0 | 0 | 0 | 0 | 0 |
| $Sb_2O_3$ | 0 | 0 | 0 | 0 | 0 | 0 | 0 | 0 |
| SnO | 0 | 0 | 0.1 | 0 | 0 | 0 | 0 | 0 |
| $SnO_2$ | 0 | 0 | 0 | 0 | 0 | 0 | 0 | 0 |
| $CeO_2$ | 0 | 0 | 0 | 0 | 0 | 0 | 0 | 0 |
| Total | 100 | 100 | 100 | 100 | 100 | 100 | 100 | 100 |
| RO | 18.27 | 16.48 | 15.44 | 15.26 | 16.25 | 18.06 | 15.9 | 14.94 |
| $CaO/(SiO_2 + ZrO_2)$ | 0.233 | 0.226 | 0.198 | 0.246 | 0.247 | 0.32 | 0.25 | 0.164 |
| $TiO_2/BaO$ | 0.838 | 0.893 | 1.04 | 1.231 | 1.07 | 0.933 | 0.987 | 1.076 |
| $TiO_2/(La_2O_3 + ZnO)$ | 0.338 | 0.3 | 0.314 | 0.381 | 0.357 | 0.331 | 0.289 | 0.333 |
| $SiO_2/(CaO + BaO)$ | 0.668 | 0.444 | 0.534 | 0.536 | 0.57 | 0.362 | 0.475 | 0.577 |
| $BaO/Nb_2O_5$ | 4.069 | 3.264 | 2.487 | 1.897 | 2.49 | 3.051 | 3.438 | 4.34 |
| $(CaO + ZnO)/BaO$ | 0.455 | 0.493 | 0.506 | 0.639 | 0.481 | 0.486 | 0.545 | 0.446 |
| $La_2O_3/(ZnO + Nb_2O_5)$ | 5.526 | 4.471 | 4.468 | 3.286 | 4.586 | 5.2 | 5.322 | 6.186 |
| $(ZnO + Gd_2O_3 + Y_2O_3)/CaO$ | 0.608 | 1.471 | 1.205 | 1.213 | 0.751 | 0.585 | 1.179 | 1.287 |
| $n_d$ | 1.8984 | 1.9072 | 1.9055 | 1.8967 | 1.8984 | 1.9022 | 1.9043 | 1.9038 |
| $v_d$ | 32.05 | 31.41 | 31.38 | 32.12 | 31.64 | 31.55 | 31.42 | 30.95 |
| $D_W$ | Class 1 | Class 1 | Class 1 | Class 1 | Class 1 | Class 1 | Class 1 | Class 1 |
| CR | Class 1 | Class 1 | Class 1 | Class 1 | Class 1 | Class 1 | Class 1 | Class 1 |
| $H_K (\times 10^7 Pa)$ | 612 | 616 | 614 | 612 | 613 | 612 | 615 | 614 |
| $F_A$ | 144 | 148 | 150 | 144 | 146 | 143 | 147 | 148 |
| $E (\times 10^7 Pa)$ | 11832 | 11814 | 11790 | 11688 | 11725 | 11884 | 11852 | 11808 |
| $\rho (g/cm^3)$ | 4.53 | 4.51 | 4.55 | 4.53 | 4.52 | 4.50 | 4.55 | 4.51 |
| $\lambda_{70} (nm)$ | 402 | 398 | 399 | 401 | 403 | 397 | 398 | 400 |
| $\lambda_5 (nm)$ | 361 | 357 | 360 | 360 | 362 | 358 | 358 | 360 |
| Bubble degree (level) | $A_{00}$ | $A_{00}$ | $A_{00}$ | $A_{00}$ | $A_{00}$ | $A_{00}$ | $A_{00}$ | $A_{00}$ |
| $\alpha_{-30/70°\ C.}(\times 10^{-7}/K)$ | 71 | 72 | 70 | 76 | 73 | 74 | 72 | 72 |
| $T_g(° C.)$ | 672 | 67 | 668 | 678 | 672 | 674 | 672 | 670 |

<Glass Preform Embodiment>

The glass obtained by Embodiments 1-24 # of the optical glass is made into a variety of lenses and prisms and other preforms such as concave meniscus lens, convex meniscus lens, biconvex lens, biconcave lens, planoconvex lens, and planoconcave lens by means of, for example, grinding, or re-thermoforming, precision stamping and other compression molding methods.

<Optical Element Embodiment>

The preforms obtained in the above-mentioned glass preform embodiment are annealed for fine-tuning of refractive index while reducing the stress inside the glass, so that the optical characteristics such as the refractive index are brought to the desired values.

Then, each of the preforms is ground and polished, and a variety of lenses and prisms such as concave meniscus lens, convex meniscus lens, biconvex lens, biconcave lens, planoconvex lens, and planoconcave lens are prepared. An antireflection film may be coated on the surface of the obtained optical element.

<Embodiments of Optical Instrument>

Through optical design and the use of one or more optical elements to form optical component or optical assembly, the optical element prepared by the above-mentioned optical element embodiment can be used, for example, in imaging device, sensor, microscope, medical technology, digital projection, communication, optical communication technology/information transmission, optics/lighting in the automobile field, photolithography, excimer laser, wafer, computer chip, and integrated circuit and electronic device including such circuit and chip.

The invention claimed is:

1. An optical glass, wherein components thereof are represented by weight percentage, comprising: 1-15% of $SiO_2$; 5-20% of $B_2O_3$; 25-50% of $La_2O_3$; 1-12% of $ZrO_2$; 5-20% of $TiO_2$; 5-20% of BaO, 0-10% of SrO; 1.35-12% of CaO, 0-10% of MgO; 6-35% of RO, and the RO is a total content of MgO, CaO, SrO, BaO;

wherein $CaO/(SiO_2+ZrO_2)$ is 0.02-1.0; and $La_2O_3/(ZnO+Nb_2O_5)$ is 3.5-6.0.

2. The optical glass according to claim 1, wherein components thereof are represented by weight percentage, further comprising: 0-8% of $Y_2O_3$; and/or 0-8% of $Gd_2O_3$; and/or 0-5% of $Yb_2O_3$; and/or 0-12% of $Nb_2O_5$; and/or 0-10% of ZnO; and/or 0-8% of $Rn_2O$; and/or 0-5% of $GeO_2$; and/or 0-5% of $WO_3$; and/or 0-5% of $Ta_2O_5$; and/or 0-5% of $Al_2O_3$; and/or 0-1% of clarifying agent, the $Rn_2O$ is one or more of $Li_2O$, $Na_2O$, and $K_2O$, and the clarifying agent is one or more of $Sb_2O_3$, SnO, $SnO_2$, and $CeO_2$.

3. The optical glass according to claim 1, wherein components thereof are represented by weight percentage, and one or more of the following 6 conditions are satisfied:
1) $TiO_2/BaO$ is 0.3-3.0;
2) $TiO_2/(La_2O_3+ZnO)$ is 0.1-0.6;
3) $SiO_2/(CaO+BaO)$ is 0.05-1.5;
4) $BaO/Nb_2O_5$ is above 0.8;
5) $(CaO+ZnO)/BaO$ is 0.1-3.0;
6) $(ZnO+Gd_2O_3+Y_2O_3)/CaO$ is below 5.0.

4. The optical glass according to claim 1, wherein components thereof are represented by weight percentage, and one or more of the following 7 conditions are satisfied:
1) $CaO/(SiO_2+ZrO_2)$ is 0.05-0.8;
2) $TiO_2/BaO$ is 0.4-2.0;
3) $TiO_2/(La_2O_3+ZnO)$ is 0.15-0.55;
4) $SiO_2/(CaO+BaO)$ is 0.1-1.0;
5) $BaO/Nb_2O_5$ is 1.0-20.0;
6) $(CaO+ZnO)/BaO$ is 0.2-2.0;
7) $(ZnO+Gd_2O_3+Y_2O_3)/CaO$ is below 4.0.

5. The optical glass according to claim 1, wherein components thereof are represented by weight percentage, and one or more of the following 7 conditions are satisfied:
1) $CaO/(SiO_2+ZrO_2)$ is 0.1-0.6;
2) $TiO_2/BaO$ is 0.6-1.5;
3) $TiO_2/(La_2O_3+ZnO)$ is 0.2-0.5;
4) $SiO_2/(CaO+BaO)$ is 0.2-0.85;
5) $BaO/Nb_2O_5$ is 1.5-10.0;
6) $(CaO+ZnO)/BaO$ is 0.3-1.0;
7) $(ZnO+Gd_2O_3+Y_2O_3)/CaO$ is 0.2-3.0.

6. The optical glass according to claim 1, wherein components thereof are represented by weight percentage, and one or more of the following 7 conditions are satisfied:
1) $CaO/(SiO_2+ZrO_2)$ is 0.1-0.5;
2) $TiO_2/BaO$ is 0.8-1.3;
3) $TiO_2/(La_2O_3+ZnO)$ is 0.25-0.45;
4) $SiO_2/(CaO+BaO)$ is 0.35-0.75;
5) $BaO/Nb_2O_5$ is 2.0-5.0;
6) $(CaO+ZnO)/BaO$ is 0.3-0.8;
7) $(ZnO+Gd_2O_3+Y_2O_3)/CaO$ is 0.5-2.0.

7. The optical glass according to claim 1, wherein components thereof are represented by weight percentage, in which: $SiO_2$ is 3-12%; and/or $B_2O_3$ is 8-17%; and/or $La_2O_3$ is 31-45%; and/or $ZrO_2$ is 2-10%; and/or $TiO_2$ is 8-18%; and/or RO is 10-25%; and/or $Y_2O_3$ is 0-4%; and/or $Gd_2O_3$ is 0-4%; and/or $Yb_2O_3$ is 0-3%; and/or $Nb_2O_5$ is 1-10%; and/or ZnO is 1-8%; and/or $Rn_2O$ is 0-4%; and/or $GeO_2$ is 0-3%; and/or $WO_3$ is 0-3%; and/or $Ta_2O_5$ is 0-3%; and/or $Al_2O_3$ is 0-3%; and/or clarifying agent is 0-0.5%, the RO is total content of MgO, CaO, SrO, and BaO, $Rn_2O$ is one or more of $Li_2O$, $Na_2O$, and $K_2O$, and the clarifying agent is one or more of $Sb_2O_3$, SnO, $SnO_2$, and $CeO_2$.

8. The optical glass according to claim 1, wherein components thereof are represented by weight percentage, in which: $SiO_2$ is 5-10%; and/or $B_2O_3$ is 10-15%; and/or $La_2O_3$ is 34-40%; and/or $ZrO_2$ is 3-8%; and/or $TiO_2$ is 11-16%; and/or RO is 11-20%; and/or $Y_2O_3$ is 0-2%; and/or $Gd_2O_3$ is 0-2%; and/or $Yb_2O_3$ is 0-1%; and/or $Nb_2O_5$ is 2-7%; and/or ZnO is 2-7%; and/or $Rn_2O$ is 0-2%; and/or $GeO_2$ is 0-1%; and/or $WO_3$ is 0-1%, and/or $Ta_2O_5$ is 0-1%; and/or $Al_2O_3$ is 0-1%; and/or clarifying agent is 0-0.2%, the RO is total content of MgO, CaO, SrO, and BaO, $Rn_2O$ is one or more of $Li_2O$, $Na_2O$, and $K_2O$, and the clarifying agent is one or more of $Sb_2O_3$, SnO, $SnO_2$, and $CeO_2$.

9. The optical glass according to claim 1, wherein components thereof are represented by weight percentage, in which: BaO is 11-16%; and/or SrO is 0-2%; and/or CaO is 2-8%; and/or MgO is 0-2%.

10. The optical glass according to claim 1, wherein components thereof do not contain $WO_3$; and/or do not contain $Ta_2O_5$; and/or do not contain $Rn_2O$; and/or do not contain $Al_2O_3$; and/or do not contain $GeO_2$; and/or do not contain $Y_2O_3$; and/or do not contain $Gd_2O_3$; and/or do not contain SrO; and/or do not contain MgO; and/or do not contain $Yb_2O_3$, and the $Rn_2O$ is one or more of $Li_2O$, $Na_2O$, and $K_2O$.

11. The optical glass according to claim 1, wherein a refractive index $n_d$ of the optical glass is 1.87-1.93, and an Abbe number $v_d$ is 28-35.

12. The optical glass according to claim 1, wherein a refractive index $n_d$ of the optical glass is 1.89-1.91, and an Abbe number $v_d$ is 30-33.

13. The optical glass according to claim 1, wherein a thermal expansion coefficient $\alpha_{-30/70° C.}$ of the optical glass is below $95 \times 10^{-7}$/K; and/or water resistance stability $D_W$ is above Class 2; and/or $\lambda_{70}$ is below 420 nm; and/or $\lambda_5$ is below 380 nm; and/or weather resistance CR is above Class 2; and/or Knoop hardness $H_K$ is above $580 \times 10^7$ Pa; and/or Young's modulus E is above $10000 \times 10^7$ Pa; and/or bubble degree is above Grade A; and/or density $\rho$ is below 4.90 g/cm$^3$; and/or abrasion degree $F_A$ is 125-165; and/or transition temperature $T_g$ is below 700° C.

14. The optical glass according to claim 1, wherein a thermal expansion coefficient $\alpha_{-30/70° C.}$ of the optical glass is below $80 \times 10^{-7}$/K; and/or water resistance stability $D_W$ is Class 1; and/or $\lambda_{70}$ is below 410 nm; and/or $\lambda_5$ is below 370 nm; and/or weather resistance CR is Class 1; and/or Knoop hardness $H_K$ is above $605 \times 10^7$ Pa; and/or Young's modulus E is above $11000 \times 10^7$ Pa; and/or bubble degree is Grade $A_{00}$; and/or density $\rho$ is below 4.60 g/cm$^3$; and/or abrasion degree $F_A$ is 135-155; and/or transition temperature $T_g$ is below 678° C.

15. A glass preform, made of the optical glass according to claim 1, optical element made of the glass or made of the glass preform, made of the optical glass.

16. An optical element, made of the optical glass according to claim 1 or made of a glass preform, made of the optical glass according to claim 1.

17. An optical instrument, comprising the optical glass according claim 1, or an optical element made of the optical glass according to claim 1, or made of a glass preform, made of the optical glass according to claim 1.

\* \* \* \* \*